United States Patent [19]

Schneider

[11] Patent Number: 4,786,062

[45] Date of Patent: * Nov. 22, 1988

[54] APPARATUS FOR CLAMPING NON-ROTATING WORK PIECES

[76] Inventor: Rudolf Schneider, Gondiswinkel, CH-5734 Reinach, Switzerland

[*] Notice: The portion of the term of this patent subsequent to Nov. 11, 2003 has been disclaimed.

[21] Appl. No.: 940,628

[22] Filed: Dec. 11, 1986

[30] Foreign Application Priority Data

Jun. 2, 1986 [DE] Fed. Rep. of Germany ....... 3618521

[51] Int. Cl.$^4$ .............................................. B23B 31/02
[52] U.S. Cl. ..................... 279/83; 269/277; 269/287; 403/13; 403/362
[58] Field of Search ............... 269/207, 287, 288, 277; 279/83, 85, 86, 87; 403/13, 362

[56] References Cited

U.S. PATENT DOCUMENTS

| | | | |
|---|---|---|---|
| 963,426 | 7/1910 | Emerson | 269/287 |
| 1,335,386 | 3/1920 | Nicholas | 269/287 |
| 1,368,683 | 2/1921 | Anderson | 269/287 |
| 1,623,045 | 4/1927 | Butt | 269/287 |
| 3,525,515 | 8/1970 | Melfi | 269/287 |
| 4,621,821 | 11/1986 | Schneider | 279/83 |

FOREIGN PATENT DOCUMENTS 2646951 4/1978 Fed. Rep. of Germany .
3347403 1/1985 Fed. Rep. of Germany .

Primary Examiner—Frederick R. Schmidt
Assistant Examiner—Judy J. Hartman
Attorney, Agent, or Firm—Tarolli, Sundheim & Covell

[57] ABSTRACT

An apparatus for clamping non-rotating work pieces which have an elongate portion or an elongate shank with polygonal, preferably square cross section, comprising a clamping body member with a hollow clamping chamber provided therein, which has a corresponding polygonal cross section. The chamber has at least one opening through which the work piece may be inserted. Clamping members are provided to clampingly fix the work piece in the clamping chamber. To define the position of the work piece at least in X- and Y-direction as well as with regard to its angular orientation, the clamping chamber is provided with a first web and a second web each projecting from a first inner side wall towards the interior of the clamping chamber and arranged in a certain distance from each other, and a third web projecting from a second, adjacent inner side wall towards the interior of the clamping chamber. The clamping members are located essentially opposite to the first and third webs such that it clamps the work piece inserted into the clamping chamber towards the first, second and third webs. The apparatus is particularly suitable to clamp electrode blanks and finished electrodes used in an electro erosive machining apparatus where high positional accuracy is required, even if the work piece is repeatedly inserted and removed from the apparatus.

11 Claims, 2 Drawing Sheets

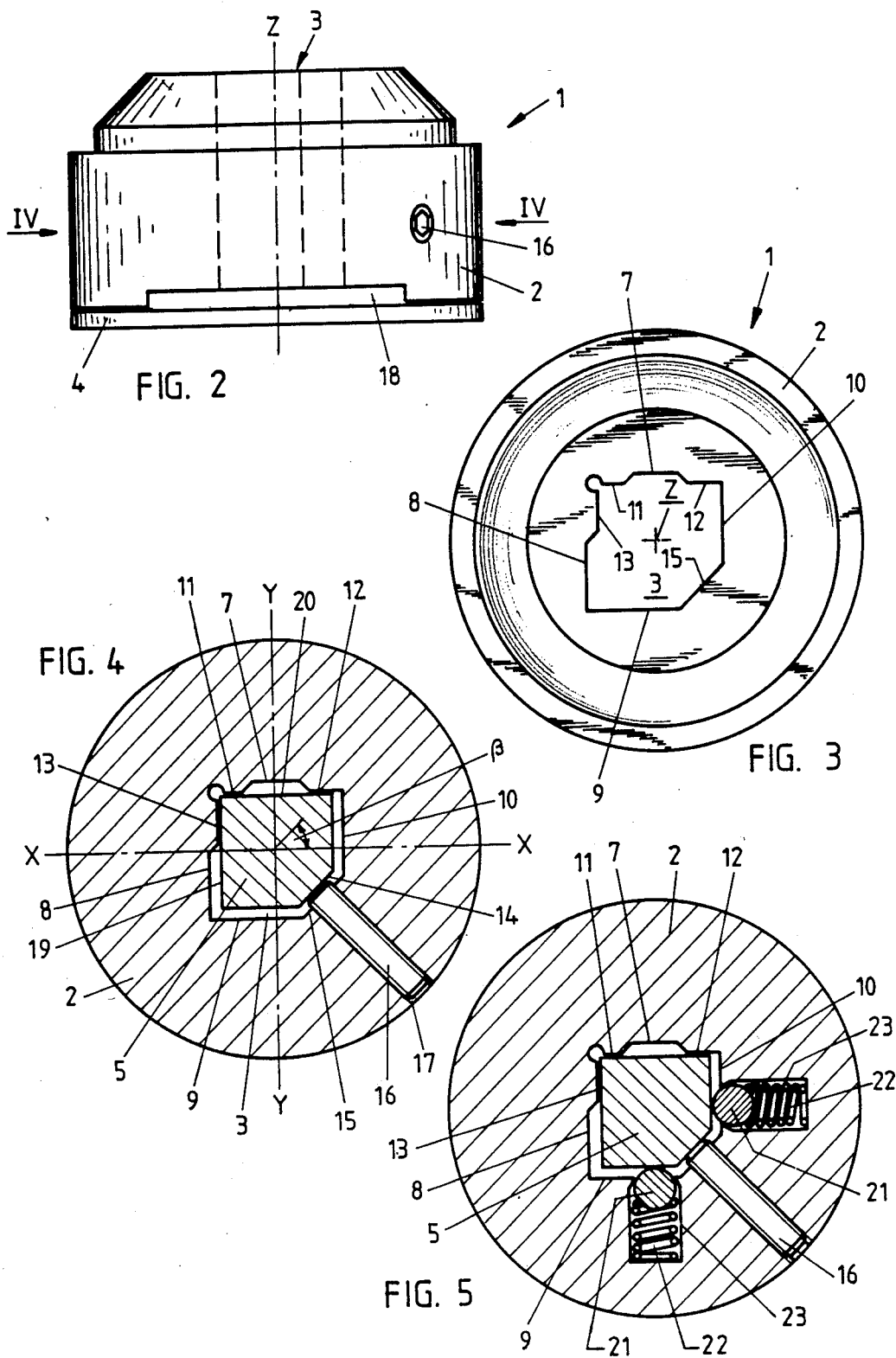

APPARATUS FOR CLAMPING NON-ROTATING WORK PIECES

BACKGROUND OF THE INVENTION

The present invention relates to an apparatus for clamping non-rotating work pieces which include an elongate portion or an elongate shank with polygonal, i.e., rectangular, cross sectional shape, preferably with regular polygonal cross sectional shape and particularly, but not exclusively, with substantially square cross sectional shape. Such work pieces may include electrode blanks which are mounted on an elongate shank, the shank thereof being clampingly received in the clamping apparatus, or electrode blanks which are of generally elongate shape to be directly received in the clamping apparatus, or finished electrodes having an elongate portion which is received in the clamping apparatus.

A clamping apparatus of the kind referred to is used to mount a tool for machining a work piece into a desired shape, e.g. an electrode for electro erosive machining of the work piece, or a work piece which has to be machined into an arbitrary shape and size, on a machining apparatus, e.g. a machine tool. It is understood that the expression "work piece" not only means a blank to be machined, but also a machining tool which has to be mounted on a machine tool with high positional accuracy. Obviously every tool once has been a blank piece which had to be machined into the desired shape. These reflections gain a pronounced importance in the field of electro erosive machining of metallic work pieces where the tools are electrodes. In this case, the "tool", i.e. the electrode, frequently is individually manufactured from a copper blank by turning and/or milling and/or grinding in order to be mounted on an electro erosive machining apparatus and to be used as the shape generating element.

Such electrode bodies, however, are tools which have to meet exceptionally high requirements as far as the dimensional accuracy is concerned, not only with reference to centricity, i.e. within the X- and Y-axes, but also with reference to its angular orientation around their central axis (Z-axis). Additionally, in many cases, a very high positional accuracy is required also along the Z-axis, i.e. the height position of the electrode with reference to the electro erosive machining apparatus.

To manufacture such an electrode body, a blank, e.g. a copper blank, is mounted in turn on a turning lathe and/or on a milling machine and/or on a grinding machine, as required, and thereby shaped into the desired final shape. Finally, the finished electrode is mounted on an electro erosive machining apparatus in order to machine a work piece with the extremely high precision common to the electro erosive machining process. In order to ensure the desired accuracy in machining, the shaping of the electrode body has to be performed within very narrow tolerance limits; this means that the mounting and clamping of the blank electrode body, of the partially machined electrode which has to be displaced from one machining station to the following one during the machining process, and of the finished electrode must be performed with very high precision, not only on the several machining stations, but also finally on the electro erosive machining apparatus itself.

Suitable coupling devices for mounting electrode bodies on electro erosive machining apparatuses are known in the art which ensure a highly precise centric mounting including a well defined angular orientation of the electrode. However, in many cases it is not possible to fix an electrode body or an electrode blank directly in such a coupling device, with the consequence that an auxiliary clamping apparatus is required. Besides the fact that such a clamping apparatus has to be very rigid and precisely manufactured, it is a primary requirement that it provides a repetitive positional accuracy which is as high as ever possible. This means with other words that a work piece, e.g. an electrode blank, during the manufacturing process or a finished electrode during subsequent erosion steps have to be removed from the clamping apparatus and re-inserted therein again many times, whereby the predetermined reference position in X-, Y- and, if required, also in Z-direction as well as with reference to the angular orientation always has to be taken up again with highest accuracy.

PRIOR ART

In German Pat. No. 33 47 403, a clamping apparatus particularly for the clamping of electrode body blanks for electro erosive machining apparatuses is disclosed. The clamping apparatus comprises a clamping body including a clamping chamber which is open at one side to receive an electrode body. Two adjoining side walls of the clamping chamber are provided with clamping screws. For the purpose of centering the electrode body in the clamping chamber, a plurality of plate members are provided and one or several of such plate members with the required thickness are inserted into the clamping chamber; finally the electrode body is fixed by tightening of the clamping screws. As this clamping apparatus is of very simple design and therefore inexpensive, it can be used in great quantities in order to receive and clampingly fix one electrode each which always remains fixed in the clamping apparatus and consequently maintains always the same position. However, the clamping apparatus referred to above is not suitable when an electrode has to be removed from the clamping chamber and re-inserted again in exactly the same position, i.e. without any deviation in X-, Y- and Z-direction as well as with reference to its angular orientation.

In German Pat. No. 26 46 951, a mounting device for mounting tools on electro erosive machining apparatuses or for mounting similar non-rotating tools is disclosed which is said to ensure a highly accurate fixing of a tool connected to a cylindrical shank. For that purpose, a chuck with a cylindrical receiving means for the shank is provided. A freely exposed frontal face of the receiving means, cooperating with a pin radially projecting from the cylindrical shank, should take care of an exact positioning of the tool in Z-direction, and a pin extending parallel to the axis of the chuck, cooperating with said radially projecting pin on the cylindrical shaft, should serve for the exact positioning of the tool with reference to its angular orientation. If the cyclindrical chuck is exactly manufactured, an exact positioning in X- and Y-direction should be ensured as well. A disadvantage of this device, however, is its complicated and thus expensive design, since it requires, in order to ensure the desired accuracy, a carefully manufactured chuck, an exactly cylindrically machined, preferably grinded and hardened shank as a supporting member for the tool, an also precisely machined, preferably hardened, axially extending pin to be accurately fixed besides the chuck as well as an also precisely machined, preferably hardened, radial pin to be accurately fixed at the shank, and finally a freely exposed frontal face at the receiving means which has to be accurately plainly finished. Such a design is quite expensive in manufacturing due to the plurality of required precision components and further is very sensitive to wear and contamination so that, in view of the last named reasons, it hardly may provide the desired high repetitive accuracy in mounting and dismounting e.g. electro erosive machining tools. Further, it must be assumed that the device referred to is hardly suitable to clampingly hold an electrode body blank with the required amount of rigidity during its machining and shaping process since thereby (e.g. during turning or milling) very high forces are exerted to the electrode blank which probably would overstrain the point-to-point contact between the radial pin at the shank and the axial pin at the receiving means in the sense of an elastic or even plastic deformation of the pins. It is obvious that in such a case the desired repetitive accuracy is not ensured any longer.

OBJECTS OF THE INVENTION

It is a primary object of the invention to avoid the disadvantages of the clamping apparatuses of the prior art and to provide a clamping apparatus which is simple in design as it comprises only a very few components which have to be precisely machined and which thus can be manufactured at a very low price. It is a further object of the invention to provide a clamping apparatus which is very rigid and may be subjected to very high forces in order to be reliably usable also during the machining and shaping process of a blank work piece. It is a still further object of the invention to provide a clamping apparatus which is highly insensitive to wear and contamination and ensures a exceptionally high repetitive positional accuracy.

SUMMARY OF THE INVENTION

Generally, the clamping apparatus of the invention is suitable for clamping any kind of work pieces and tools which either have an elongate portion or comprise an elongate shank or are of elongate shape itself with a polygonal cross sectional shape of arbitrary form and size. In a first, universally used embodiment, the apparatus comprises a clamping body member with a hollow clamping chamber provided therein. The clamping chamber has a polygonal i.e., rectangular, cross sectional shape and includes first and second inner side walls which are adjacent to each other, and at least one opening through which the elongate portion or elongate shank may be inserted into the clamping chamber.

In order to define the position of the elongate portion or shank at least in X- and Y-direction as well as with regard to its angular orientation, reference means is provided in the clamping body member, cooperating with the elongate portion or shank and comprising a first web and a second web each projecting from said first inner side wall towards the interior of said clamping chamber and arranged in a certain distance from each other. The reference means further comprises a third web projecting from said second inner side wall towards the interior of said clamping chamber.

To clampingly fix the elongate portion or shank in the clamping chamber, a clamping means is provided which is located essentially opposite to said first and third webs such that it clamps the elongate portion or shank inserted into the clamping chamber towards said first, second and third webs.

With the clamping apparatus according to the invention, quite common, e.g. square, bright drawn copper or steel bars may be used as shank which are available as inexpensive stock merchandise. Surprisingly such bars need no further finishing or treatment such as grinding, polishing or hardening in order to ensure the desired positional accuracy when used in the clamping apparatus according to the invention. On the other hand, it is possible as well, if desired, to directly clamp an electrode blank which has a polygonal, preferably a square or rectangular cross sectional shape, in the clamping apparatus of the invention. The positively defined but not redundant abutment of two adjoining lateral faces of the portion or shank of the work piece on the three webs results in an accurate positioning of the work piece in X- and Y-direction as well as with reference to its angular orientation.

Usually it will be made sure that the polygonal cross sectional shape of the clamping chamber substantially corresponds to the polygonal cross sectional shape of the portion or shank of the work piece to be clampingly fixed. However, it is also possible to fix a portion or shank of a work piece which has a certain polygonal cross sectional shape in a clamping chamber with a different polygonal cross sectional shape if the size of the portion or shank of the work piece is sufficiently less. Besides that, it is usually preferable if the cross sectional dimensions of the clamping chamber are greater than the cross sectional dimensions of the elongate portion or shank such that a substantial clearance around the elongate portion or shank results when said elongate portion or elongate shank is inserted into the clamping chamber. Thereby it is made sure that the portion or shank of the work piece may be easily and effortlessly inserted into the clamping chamber and that any negative influences of contamination are decreased or even avoided.

A particularly preferred embodiment of the clamping apparatus of the invention is suitable for the clamping of work pieces with a portion or shank which has a substantially square cross sectional shape. It is understood that in this case the cross sectional shape of the clamping chamber is substantially square as well and preferably somewhat larger in its dimensions. Square copper or steel bars are readily available in different sizes and qualities and can either be used as shank to which the real electrode body is e.g. welded, or as an electrode body blank itself. It is not of paramount importance that the two inner side walls of the clamping chamber from which the webs project be exactly perpendicular to each other though such exact perpendicular positional relationship may easily be realized e.g. by finishing the clamping chamber by a wire erosion process well known in the art.

If a lateral edge of the square portion or shank of the work piece to be clamped is chamfered, and if the clamping chamber has a correspondingly oblique side wall, it is ensured that the portion or shank of the work piece may be inserted only in a certain angular orientation, i.e. in a predetermined coarse angular position. This measure greatly facilitates the handling of the apparatus according to the invention.

Preferably, the aforementioned oblique wall is located opposite to the two adjacently situated webs, i.e. the aforementioned first and third webs, and encloses an engle of 45° with each adjacent inner side wall of the clamping chamber. To clampingly fix the portion or shank of the work piece in the clamping chamber, a clamping screw may be provided, received in a continuous threaded bore in the centre of the oblique wall, whereby the axis of this threaded bore is perpendicular to the inner surface of the oblique wall and thus points towards the common side edge of the aforementioned first and second inner side walls of the clamping chamber.

It it is desired to position the portion or shank of the work piece also in Z-direction, the clamping chamber may be provided with a bottom plate, either fixed thereto or integrally formed, against which the front face of the portion or shank of the work piece abuts when it is inserted into the clamping chamber. In order to remove dust or chips which may be provided with two diametrally opposite openings located near the bottom plate to gain access to the interior of the clamping chamber from the side. Such contamination may be easily blown out by means of a jet of pressurized air.

In a still further embodiment of the apparatus according to the invention, the inner side wall of the clamping chamber which is opposite to the aforementioned first inner side wall, and the inner side wall of the clamping chamber which is opposite to the aforementioned second inner side wall, each comprise resilient means which is adapted to abut against the adjoining side faces of the portion or shank of the work piece when it is inserted into the clamping chamber and thereby press the portion or shank towards the aforementioned first, second and third webs. Preferably, the resilient means comprise balls which are pressed against the adjoining side faces of the portion or shank of the work piece by means of springs received in blind bores provided in the aforementioned opposite side walls.

BRIEF DESCRIPTION OF THE DRAWING

In the following, some embodiments of the apparatus according to the invention will be further described, with reference to the accompanying drawings. In the drawings.

FIG. 2 a side view of the clamping apparatus of FIG. 1 without the tool shank and electrode body blank;

FIG. 3 a top view of the apparatus of FIG. 2;

FIG. 4 a sectional view of a clamping apparatus with inserted shank along the line IV—IV in FIG. 2;

FIG. 5 a view corresponding to FIG. 4, but of another embodiment of the clamping apparatus according to the invention and FIG. 6 is a view corresponding to FIG. 4, but of still another embodiment of the clamping apparatus according to the present invention.

DESCRIPTION OF PREFERRED EMBODIMENTS

Figure 1:
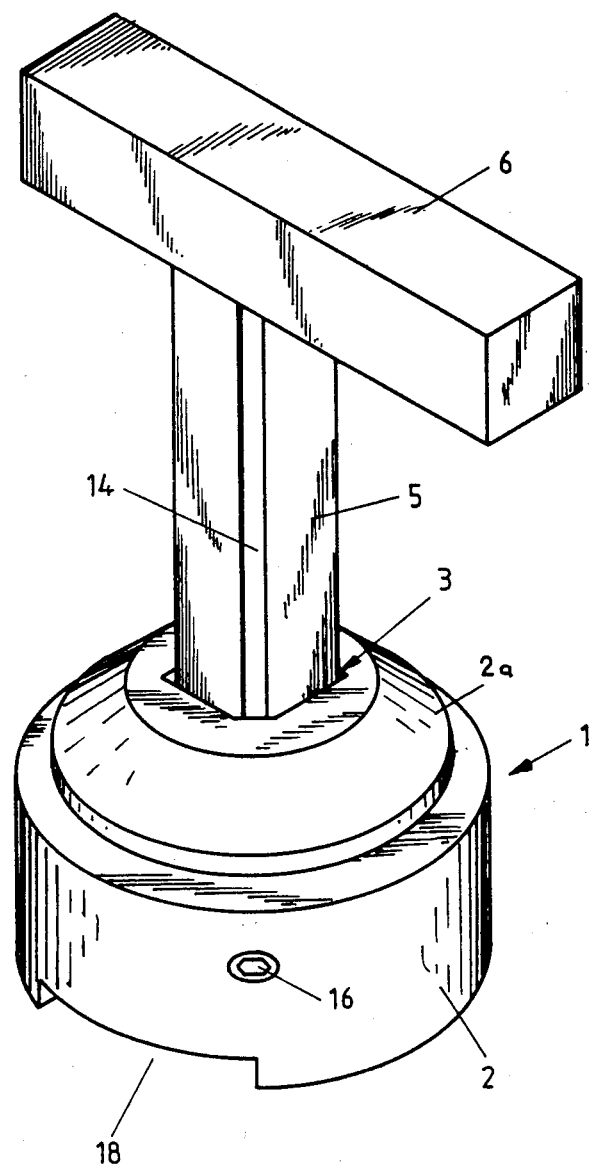
FIG. 1 shows a diagrammatic perspective overall view of a first embodiment of the clamping apparatus according to the invention, clampingly receiving an elongate tool shank with an electrode body blank mounted on its end.

All the embodiments of the clamping apparatus according to the invention, generally designated with reference numeral 1, and shown in FIGS. 1 to 6 of the drawings, are adapted to clampingly receive non-rotating work pieces or tools and the shanks thereof, respectively. According to FIG. 1, the clamping apparatus 1 comprises a clamping body 2 which, in the present embodiment, has the shape of a cylindrical metal block member manufactured e.g. of tool steel with a top portion 2a integrally formed therewith and having the shape of a truncated cone. It is obvious that the clamping body may have of arbitrary shape and size, but preferably it has a regular symmetrical shape as e.g. a cube or cuboid.

The clamping body 2 is provided with a hollow clamping chamber 3 which extends along and is essentially coaxial to the vertical central axis Z of the clamping apparatus (cf. FIG. 2). The clamping chamber 3 is open at its top in any case, and may be open or closed at its bottom, as desired. In the embodiment shown in FIG. 1, the clamping chamber 3 is open at its bottom, while FIG. 2 shows an embodiment of the clamping apparatus which has a clamping chamber 3 closed at its bottom. For this purpose there is provided a base plate member 4 which may be mounted on the bottom of the clamping body 2 in any suitable manner by fixing means (not shown) or, alternatively, may be integrally formed with the clamping body 2. Further details will be explained hereinafter.

As can be seen from FIG. 1, the clamping chamber 3 serves to receive a shank 5, on the free end thereof being mounted a work piece 6, e.g. an electrode blank or a finally machined electro erosion electrode. In some cases it may be appropriate to use the clamping apparatus of the invention to clamp a tool or a work piece directly; this is well possible as long as the tool or work piece has at least a portion with elongate shape and fitting cross sectional size.

Referring now to FIG. 3, it can be seen that the clamping chamber 3 has essentially square cross section as seen perpendicularly to the axis Z and extends along this axis Z through the clamping body 2. The clamping chamber 3 generally comprises four inner side walls 7, 8, 9 and 10 extending parallel to the axis Z whereby each two adjacent inner side walls are arranged at least approximately in right angles to each other. The first inner side wall 7 comprises first and second webs 11 and 12, respectively, which project from the inner side wall 7 towards the interior of the clamping chamber 3. The webs 11 and 12 are located in a certain distance to each other and extend parallely to each other as well as parallely to the central axis Z. The first web 11 is situated in an edge portion of the inner side wall 7 adjacent to the second inner side wall 8, and the second web 12 is situated in another edge portion of the inner side wall 7 adjacent to the fourth inner side wall 10. The first and second webs 11 and 12, respectively, are comparatively narrow; preferably the sum of the widths of the webs 11 and 12 is substantially less than half the width of the inner side wall 7.

The second inner side wall 8 comprises a single, third web 13 projectiong from the wall 8 towards the interior of the clamping chamber 3 as well and also extending parallely to the central axis Z. The third web 13 is located in an edge portion of the second inner side wall 8 adjacent to the first web 11 on the first inner side wall 7 and has a width which is in any case substantially less than half the width of the second inner side wall 8. The webs 11 and 12 on the one hand and the web 13 on the other hand serve as first and second reference and stop faces, respectively, for the shank 5 received in the clamping chamber 3, as will be more fully explained hereinafter.

The shank 5 to be received in the clamping chamber 3 also has essentially square cross section and is preferably manufactured of bright drawn copper or of tool steel; experience has proven that the surface quality of such shanks, without any additional finishing or treatment, is quite sufficient to mount them precisely and with very high repetitive positional accuracy in the clamping apparatus 1 of the invention. One of the longitudinal edges of the shank 5 is chamfered, preferably under an angle of 45° such that an oblique surface 14 results. Accordingly, the clamping chamber 3 also comprises an oblique portion in the form of a side wall 15 which extends under an angle of 45° with reference to the adjacent side walls 9 and 10.

The oblique side wall 15 is diametrally opposite to the adjacent first and third webs 11 and 13, respectively, which project from the inner side walls 7 and 8, respectively, of the clamping chamber 3. Thus, the cross sectional shape of the clamping chamber 3 corresponds to the cross sectional shape of the shank 5 to be received in the clamping chamber 3. As a first result, the oblique surface 14 provided on the shank 5 and the oblique inner side wall 15 in the clamping chamber 3 ensure that the shank 5 may be inserted into the clamping chamber 3 only in a well defined predetermined position as far as its angular orientation is concerned.

The clear cross sectional opening of the clamping chamber 3 is somewhat larger than the cross sectional dimensions of the shank 5 with the result that a certain clearance is provided around the shank 5. The purpose of providing some clearance is, on the one hand, to enable the shank 5 to be easily and effortlessly inserted into the clamping chamber 3 and, on the other hand, to diminish or exclude the negative influences of a possibly occurring contamination of the shank 5 and/or the inner side walls of the clamping chamber 3.

To fix the shank 5 in the clamping body 2, a clamping screw 16 is provided, preferably in the form of a stud screw, which is received in a continuous threaded bore 17 provided in the wall of the clamping body 2. The virtual extension of the central axis of the screw 16 runs from the centre of the oblique side wall 15 to the edge between the two side walls 7 and 8, thus points towards the two webs 11 and 13. With other words, the direction of operation of the screw 16 essentially coincides with the median line of the angle between the two adjacent side walls 7 and 8 of the clamping chamber 3. In order to enable the clamping screw 16 to perform the desired clamping action, it is located in the centre of the oblique wall 15 of the clamping chamber 3 and extends perpendicularly to its inner surface.

Another possibility which is shown in FIG. 6 of the drawings consists in providing two clamping screws 26 which penetrate the clamping body 2 and which merge into the clamping chamber 3 in the centre of the side walls 9 and 10, respectively, in order to jointly press the shank 5 towards the webs 11, 12 and 13.

As can be seen from FIGS. 1 and 2, the clamping body 2 is provided at its lowermost portion with two oppositely located openings 18 which may have e.g. the shape of slots. In FIGS. 1 and 2 only one of these slots 18 is shown, i.e. the one at the front side of the clamping body 2; the other one is at the back side and corresponds to the frontal one in size and shape. The purpose of these openings 18 is to provide the possibility to blow out any contaminations like chips or the like which may collect at the bottom of the clamping chamber 3 by means of pressurized air.

If it is desired to mount the shank 5 and thereby the work piece also in a predetermined, well defined vertical position, i.e. along the Z-axis, the bottom of the clamping chamber 3 may be provided, as already mentioned, with a base plate 4. One possibility is to fix the base plate 4 to the bottom of the clamping body 2 by means of screws or similar means (not shown), or another possibility consists in integrally forming the base plate 4 with the clamping body 2. However, said latter possibility is less appropriate if the shape of the clamping chamber 3 is to be realized by a wire erosion process which ensures, as is well known in the art, an extremely accurate machining of a metallic work piece. On the other hand, in certain cases, it is not required at all to provide a separate base plate member 4, particularly not in the case when the clamping body 2 is put on the plain mounting surface of a coupling member, of a machining apparatus or the like or is fixedly connected thereto (not shown).

Independently whether a separate base plate member 4 is provided or the latter is formed by any suitable mounting surface, a positioning in Z-direction is ensured as the lower front face of the shank 5 will abut against said base plate member 4 or said mounting surface upon insertion of the shank or work piece into the clamping chamber 3. It is of no importance for the repetitive accuracy, which first of all has to be maintained at a very high level, whether said frontal face of the shank 5 be exactly plain or exactly perpendicular to the central axis of the shank 5 or not as long as the shank 5 is not hit into the clamping chamber 3 with brutal force. To do this, however, is never necessary since always enough clearance around the shank 5 is provided to enable the latter to be effortlessly and gently inserted into the clamping chamber 3 until the front face of the shank 5 is in touch with the base plate member 4 or the plain mounting surface terminating the chamber 3.

A further developed embodiment of the clamping apparatus according to the invention is shown in FIG. 5. This drawing shows a cross sectional view similar to the one shown in FIG. 4. The design of the embodiment of FIG. 5 corresponds essentially to the design of the embodiment discussed hereinbefore, with the exception of that resilient pressure members are provided in the clamping chamber 3 which exert a force on the shank 5. According to FIG. 5, the inner side walls 9 and 10 of the clamping chamber 3, i.e. the side walls which are opposite to the webs 11, 12 and the web 13, respectively, are provided each with a blind bore 23, each of which receiving a pressure spring 22.

The open end of each bore 23, i.e. the end merging into the clamping chamber 3, is somewhat narrowed, and the bores 23 each receive a ball 21 which are forced towards the clamping chamber 3 under the influence of the springs 22, but cannot leave the bores 23 due to their narrowed opening. The shank 5 being inserted, as shown in FIG. 5, the balls 21 abut on the adjoining side surfaces of the shank 5 and press it towards the webs 11, 12 and 13, respectively. Thus, a certain pre-centering of the shank 5 within the clamping apparatus 1 is realized, and simultaneously the handling of the apparatus is facilitated since the shank 5 will be firmly hold in the clamping chamber 3 due to the pressure excerted by the springs 22 via the balls 21 up to the final tightening of the clamping screw 16.

The clamping screw 16 being released, the shank 5 may be easily inserted into the clamping chamber 3, if appropriate until its frontal face abuts against the base plate member 4 or a plain mounting surface. If there is a visible contamination on the bottom of the clamping chamber 3, pressurized air is blown into the clamping chamber through the openings 18. In the case of the embodiment according to FIG. 5, the balls 21 which are under the influence of the springs 22 ensure that the shank 5 already abuts against the surface of the webs 11, 12 and 13 with quite good approximation to the desired final position of the shank 5. Now the clamping screw 16 is slowly tightened and the shank 5 moves diametrally towards the webs 11, 12 and 13, respectively until two adjacent side surfaces of the shank 5 firmly abut on the webs, i.e. in the example according to FIG. 4 the side surface 19 on the surface of the web 13 and the side surface 20 on the surfaces of the webs 11 and 12. Thus the position in X- and Y-directions (cf. FIG. 4) as well as with regard to the rotation angle $\beta$ is positively fixed, but not redundant, and the position of the shank 5 in Z-direction is fixed by the abutment of the lower front face of the shank 5 against the base plate member 4 or another suitable stop surface.

To remove the shank 5 and thereby the work piece from the clamping apparatus, the clamping screw 16 is released and the shank 5 can be pulled out easily. In the embodiment of FIG. 5, the spring-loaded balls 21 prevent the shank from falling out inadvertently, particularly if the clamping apparatus is mounted in an inverted position.

Experience has shown and tests performed by the Inventor have proven that the repetitive positional accuracy is surprisingly high despite the fact that the apparatus of the invention is of very simple design. For instance, if a shank consisting of a bright drawn copper bar with a size of 0.6×0.6 inch is used, which has not been further finished or treated in whatsoever way, a repetitive positional accuracy within 0.4 mil in all directions may be realized even if the shank has been removed from and reinserted into the clamping apparatus for hundreds of times.

What I claim is:

1. An apparatus comprising:
 a nonrotating part which includes an elongate portion with substantially square cross-sectional shape and comprising substantially mutually perpendicular first, second, third, and fourth side wall and an oblique side wall extending between the third and fourth side walls of said elongate portion;
 a clamping body member for receiving the nonrotating part therein, said clamping body member including:
 a hollow clamping chamber in said clamping body member, said clamping chamber having a substantially square cross-sectional shape and including substantially mutually perpendicular first, second, third, and fourth inner side walls complimentary to said first, second, third, and fourth side walls of said elongate portion and an oblique inner side wall extending between said third and fourth inner side walls and extending substantially parallel to the oblique side wall of said elongate portion and substantially perpendicular to a median line bisecting the angle between the first and second inner side walls, and at least one opening through which the elongate portion of the part may be inserted into said clamping chamber;
 reference means in said clamping chamber, cooperating with the elongate portion of the part to define the position of the elongate portion at least in X- and Y-directions as well as an angular orientation thereof;
 said reference means compromising first and second webs spaced from each other and projecting from said first inner side wall toward the interior of said clamping chamber, and a third web projecting from said second inner side wall toward the interior of said clamping chamber, and
 clamping means for clamping the elongate portion of the part in said clamping chamber, said oblique inner side wall having a threaded bore extending therethrough along said median line, and said clamping means comprising a clamping screw extendable through said threaded bore for engaging the oblique side wall of said elongate portion of said part to clamp the elongate portion against said first, second and third webs.

2. A clamping apparatus according to claim 1, in which the cross sectional dimensions of said clamping chamber are greater than the cross sectional dimensions of said elongate portion such that a substantial clearance around said elongate portion results when said elongate portion is inserted into said clamping chamber.

3. A clamping apparatus according to claim 1, in which said first, second and third webs extend parallel to the direction of the central longitudinal axis of said elongate portion.

4. A clamping apparatus according to claim 3, in which said first web is located in a region of that side edge of said first inner side wall which adjoins said second inner side wall, and in which said second web is located in a region of the opposite side edge of said first inner side wall, and in which said third web is located in a region of that side edge of said second inner side wall which adjoins said first inner side wall.

5. A clamping apparatus according to claim 1, in which a further reference means is provided to define the position of said elongate portion in Z-direction, said further reference means constituted by a bottom face of said clamping chamber.

6. A clamping apparatus according to claim 5, in which said clamping chamber comprises two diametrally opposite openings located in a region of said bottom face.

7. A clamping apparatus according to claim 1, in which a sum of widths of said first and second webs is less than half width of said first inner side wall.

8. A clamping apparatus according to claim 1, in which width of said third web is less than half width of said second inner side wall.

9. A clamping apparatus according to claim 1, in which said clamping chamber further includes a third inner side wall which is opposite to said first inner side wall, and a fourth inner side wall which is opposite to said second inner side wall, each of said third and fourth side walls comprising resilient means which is adapted to abut against the adjoining side faces of said elongate portion when it is inserted into said clamping chamber and thereby press said elongate portion towards said first, second and third webs.

10. A clamping apparatus according to claim 9, in which said resilient means comprises balls which are pressed against said adjoining side faces of said elongate portion by springs received in blind bores provided in said third and fourth inner side walls.

11. The clamping apparatus as defined in claim 1, used as a clamping means to clampingly receive electrode body blanks and finished electrodes for electro erosive machining apparatus.

* * * * *